＊＊＊

US006347409B1

(12) United States Patent
Nile et al.

(10) Patent No.: US 6,347,409 B1
(45) Date of Patent: Feb. 19, 2002

(54) MANUFACTURE OF RUBBER ARTICLES

(75) Inventors: Jeffery G. Nile, Alliance; Stanley J. Gromelski, Canton; Nevin D. Gerber, New Philadelphia, all of OH (US)

(73) Assignee: Ansell Healthcare Products Inc., Red Bank, NJ (US)

( * ) Notice: Subject to any disclaimer, the term of this patent is extended or adjusted under 35 U.S.C. 154(b) by 0 days.

(21) Appl. No.: 09/565,134

(22) Filed: May 5, 2000

Related U.S. Application Data

(63) Continuation of application No. 08/984,604, filed on Dec. 3, 1997, now Pat. No. 6,075,081, which is a continuation-in-part of application No. 08/847,323, filed on Apr. 23, 1997, now abandoned, which is a continuation of application No. 08/102,621, filed on Aug. 5, 1993, now abandoned.

(51) Int. Cl.$^7$ ............... A41D 19/00; B28B 7/22; B28B 1/38; B05D 3/00; B29D 22/00
(52) U.S. Cl. ............... 2/168; 2/161.7; 264/255; 264/300; 264/306; 427/2.3; 428/36.8; 428/36.91; 428/492
(58) Field of Search ............... 2/161.7, 168; 604/347, 604/349, 327; 264/255, 300, 306; 427/2.3; 428/36.8, 36.91, 492

(56) References Cited

U.S. PATENT DOCUMENTS 6,075,081 A  *  6/2000  Nile et al. ............... 524/429

FOREIGN PATENT DOCUMENTS

| EP | A-0 456 333 | 11/1991 | ............. C08K/3/22 |
| JP | A-59 119 701 | 11/1984 | |
| WO | WO-A-81 00346 | 2/1981 | ............. A41D/19/00 |
| WO | WO-A-93 06996 | 4/1993 | ............. B32B/25/04 |

* cited by examiner

Primary Examiner—Patrick D. Niland
(74) Attorney, Agent, or Firm—Gardner, Carton & Douglas

(57) ABSTRACT

A powder-free coagulant for use in latex dipping processes comprises a salt stable dispersion of a polychloroprene rubber and an inorganic metal salt. Optionally the coagulant will also contain a powder-free release agent, to aid release of the dipped article from the former, comprising a polypropylene wax emulsion and a cationic surfactant.

18 Claims, No Drawings

MANUFACTURE OF RUBBER ARTICLES

This is continuation of Ser. No. 08/984,604 filed Dec. 3, 1997, now U.S. Pat. 6,075,081 which is a continuation-in-part of application Ser. No. 08/847,323, filed Apr. 23, 1997, which is abandoned, which is a continuation of Ser. No. 08/102,621 filed Aug. 5, 1993 abn.

FIELD OF THE INVENTION

This invention relates to powder-free rubber articles produced by latex dipping and to the methods and materials used in their manufacture. More particularly, the invention relates to the production of powder-free natural and synthetic rubber latex medical articles, such as surgical and medical gloves, condoms and catheters, by employing a powder-free coagulant during fabrication.

BACKGROUND OF THE INVENTION

The manufacture of a typical latex surgical glove generally requires latex and powders, as well as water, vulcanizing agents, accelerators, activators, blockers, retarders, antioxidants, preservatives, odorants, colorants, stabilizers, and other processing aids. The powder serves two important functions in the manufacture and use of latex gloves and other products—it facilitates the release of a glove from a glove former during manufacture and it aids the donning of the gloves during use.

Gloves are manufactured by dipping ceramic or aluminum glove formers shaped like hands into tanks of liquid latex and admixed chemicals. The formers are precoated with a coagulant to gel the latex and to facilitate the subsequent removal of the glove from the former. The precoated formers are then dipped in the tanks of chemicals necessary to make the gloves. The "wet" gloves are dried and cured in a heated oven and the latex glove cures on the mold. The outside layer of the dipped former will ultimately be the inside of the glove. While still on the formers, the latex gloves also go through one or more rinses to leach out proteins and residual chemicals before they are stripped off the mold, packaged, and sterilized. The latex contains vulcanization agents that cure the natural rubber and produce a dry rubber film. Thus, the film surface of the cured natural rubber is quite "tacky" after the Clove is dried. It is therefore necessary to incorporate detackifying powders in the manufacturing process to facilitate the release of a glove from its glove former. Powders are also used to aid the donning of the gloves.

The use of powder complicates the manufacturing process and may cause respiratory problems for workers during the manufacturing process. Likewise, powder can be released into the air and inhaled when medical or health care personnel don and remove their gloves during subsequent use.

In order to reduce the likelihood of such problems, it is common practice for health care personnel to remove excess powder from the gloves after donning by wiping gloves thoroughly with a sterile sponge or sterile towel. Similarly, manufacturers attempt to minimize the amount of powder on the gloves they manufacture by including additional manufacturing steps in the glove fabrication process. For example, some manufacturers subject the fabricated gloves to air-blowing or tumbling operations to remove excess powder. Other processes include encapsulation of the powder in the gloves by dipping the formed glove in a laminate material having better donning properties than the base rubber. Yet other processes halogenate the formed gloves to remove the powder and create a smooth glove surface.

Each of the foregoing processes reduce, but do not eliminate, the problems associated with the use of powdered gloves. As a result, one process completely eliminates the use of powder. U.S. Pat. No. 4,548,844 to Podell et al. discloses a powder-free article made by conventional dipping techniques. However, Podell et al. eliminates the use of powder only by using a manufacturing process substantially more complex than that of the prior art. Whereas the prior art rendered glove surfaces tack-free by washing the finished gloves in a slurry of powder, Podell et al. achieved a powder-free glove only by washing the finished glove (i.e., after removal from the former) in a surfactant or an emulsion such as an aqueous silicone solution, and drying the washed glove in a heated oven prior to a final rinse in water. Moreover, the surfactant or emulsion was effective to eliminate tack only if further steps, such as dipping the former in acid and a hydrophilic polymer, were taken prior to vulcanizing the glove and removing it from the formers. Thus, Podell et al. does not render the manufactured glove tack-free until after the glove is removed from the former on which it is made.

Because powder is used in glove manufacturing processes in order to facilitate removal of the gloves from the glove formers, such powder-free gloves are difficult to remove from their formers because they are tacky. The process required to strip such gloves is much more complicated or labor intensive and also more time consuming than it would be if the gloves on the formers were tack-free. For example, because the gloves manufactured according to Podell et al. were still tacky while on the formers, they had to be removed from their formers by manual labor. Many gloves are lost because they stick to the formers and are damaged during the removal process. It is therefore desirable to have a powder-free, tack-free glove that has good donning properties, that can be easily stripped from the glove formers following fabrication and that can be manufactured with a minimum number of processing steps.

The present invention solves the foregoing problems by providing a powder-free glove that is readily removable from the glove former following glove fabrication. The present invention also provides a powder-free coagulant and a glove fabrication process that includes that powder-free coagulant.

SUMMARY OF THE INVENTION

Accordingly, it is an object of the present invention to provide powder-free rubber articles produced by latex dipping.

It is another object of the present invention to provide a powder-free glove that can be easily stripped from the glove formers following fabrication.

A further object of the present invention is to provide such powder-free rubber articles that are durable and provide cut and abrasion protection.

The foregoing and additional objects are realized in the present invention that provides a powder-free coagulant composition for natural rubber latex. The coagulant composition includes an aqueous, salt stable polymer dispersion and at least one inorganic metal salt.

According to another embodiment of the present invention the coagulant composition may be employed in combination with a surfactant, a release agent, such as polypropylene wax, and a cationic surface active agent.

According to a further aspect of the present invention, a method of preparing a rubber article is provided that includes the steps of: dipping a shaped, pre-heated former into an aqueous, powder-free solution which comprises an aqueous, salt stable polychloroprene dispersion and an inorganic metal salt; dipping the former in a dispersion of a natural rubber latex to form a gelled latex film and to create a tack-free surface for the article; leaching the gelled latex film; curing the formed rubber article on the former; and dry stripping the cured tack-free article from the former.

Articles produced in accordance with the invention include those produced by conventional latex dipping processes, such as medical and surgical gloves, condoms and catheters.

Other features, objects and advantages of the present invention will become apparent from the following detailed description and claims.

DETAILED DESCRIPTION OF THE INVENTION

According to the present invention, various articles, and in particular gloves, may be manufactured using a variety of different techniques. According to a preferred embodiment, the gloves are produced in a mass production line where a great plurality of gloves are sequentially, rapidly and consistently produced. Such a technique conveys and manipulates multiple glove formers through a series of chemical solutions that make the glove. The formers are made of porcelain, steel or plastic. According to the standard manufacturing process, gloves may be produced directly on the formers that are conveyed from one station to the next. For example, the formers are dipped into surfactants, waxes, coagulants and natural or synthetic resins to obtain a layer of the desired characteristics. The formers can also be overdipped with a silicone emulsion. The technique allows for altering the composition, the order of application, and the method of application of ingredients that make up the layer of the glove. In addition, specific characteristics of the material, such as breathability, moisture absorbency, thickness, tensile strength, penetration resistance, stretch characteristics, flexibility and density of the finished product, may be controlled.

The glove may be built up from multiple dips into various substances. For example, the formers may be initially dipped into a composition of a powder free release agent and a coagulant. That release agent and coagulant dip supplies a release material for the subsequent removal of the finished glove from the formers. In addition, the coagulant material will destabilize subsequent liquid resin materials such as elastomers.

Alternatively the former may be first treated with a powder-free release agent and then with a coagulant. Separate applications of the powder-free release agent and coagulant may necessitate a long drying period between and after their application. Such long drying times are costly as they require modifications to a continuous dipping line. The two step method of treating the formers also requires greater temperatures than that of the one step process. As a result, more complicated parameter control is required and cost is increased. But, the mixture of coagulant and release agent for use in a single dipping step does not exhibit the degree of instability that would normally be expected due to the differing chemical characteristics of the constituents used in compounding the powder-free coagulant.

After the release agent/coagulant dip is applied, the formers are preferably conveyed to the next station in the production line where the laminate layer is applied to the formers. The laminate layer may be comprised of an elastomeric or liquid resin dip, such as natural rubber latex. Alternatively, the laminate layer may be a natural or synthetic rubber, such as synthetic latex, polyurethane, nitrile or polychloroprene. By varying the content of the latex material, the laminate layer may be varied to provide different degrees of strength, comfort and flexibility. In any event, the content of the latex applied to the former will preferably be adjusted to provide the desired gripability, protection from cuts and abrasions and liquid repellency. If desired, the gelled latex film can be overdipped with copolymers of vinyl methyl ether and maleic esters.

After the application of the laminate layer, a second coagulant dip may be applied if another laminate layer is to be applied. The second coagulant dip, which is preferably in the form of a tackifying agent, provides a medium for adherence of the laminate applied in the next step. According to an alternative technique, the formers may be immersed into an adhesive dip to provide strength and a tacky surface for the application of the next laminate layer. Such an adhesive dip may be comprised of any synthetic resin material, and preferably an elastomer. Different degrees of strength and flexibility may be obtained by varying the characteristics of the adhesive material. After application of either a second coagulant dip or an adhesive dip, the formers are conveyed to the next station where the next laminate layer is applied.

After application of one or more laminate layers, the formers are preferably passed through ovens at elevated temperatures to dry and cure and provide the final product. The gloves are then removed either manually or by an automated technique.

According to the substantially automated mass production technique described above, a great number of variations may be introduced to provide additional or different desired characteristics of the laminate in accordance with the present invention.

The preferred embodiment of the powder-free coagulant dip is a formulation including a coagulant mixed with water, a surfactant, a detackification agent, an aqueous polychloroprene and an accelerator. That embodiment permits the different functions of the discrete components to be performed in a single dipping step rather than multiple dipping steps.

According to the present invention, the coagulating solution includes an aqueous solution of a divalent cationic metal salt and a salt stable polymer. Preferably, the salt is calcium nitrate and the calcium nitrate content is between about 7% and about 50% by weight of the total coagulant content. More preferably, the calcium nitrate content is in a range of about 30% to 45% of the total coagulant content. The coagulating agent most preferably comprises aqueous based calcium nitrate having a solids content of about 60% to about 70% by weight of the raw material. Other divalent cationic metals salts such as, for example, calcium chloride, zinc nitrate, zinc chloride, magnesium acetate, magnesium nitrate, aluminum nitrate and aluminum sulphate may be used individually or in combination with the calcium nitrate.

The salt stable polymer dispersion employed in the present invention is preferably a salt-stable and electrolyte-stable polychloroprene dispersion. Suitable polychloroprenes include those sold under the trade name Neoprene. The preferred embodiment in accordance with the present invention includes Neoprene 115, having a raw material solids content of about 46%. Preferably, the quantity of polychloroprene in the coagulant of the present invention is between about 1% and about 20% by weight of the coagulant. More preferably, the polychloroprene content is between about 1% and about 8% of the total coagulant content. Of course, other salt stable dispersions, such as, for example, polyurethenes available from Witco Corp., 6200 W. 51st Street, Chicago, Ill., under the trade designations YA127-71 and YA127-79, may also be used in accordance with the invention.

A cross-linking agent to cure the salt stable polymer may also be added. Suitable cross-linking agents include dicarboxylic and tricarboxylic acids, polyamide resins and melamine formaldehyde resins. Preferably, the cross-linking agent is present in an amount between about 3% and about 15% by weight of the polychloroprene and more preferably, between about 5% and about 10% by weight of the polychloroprene.

The presence of a surfactant, or surface active agent, in the coagulant composition increases the stability of the dispersion. The surfactant also provides advantageous coagulant film forming properties because it has a greater affinity for the former than it does for the chloroprene in the dispersion. As a result, the surfactant acts as a mold release between the former and the chloroprene and thereby facilitates removal of the formed article from the former without the need for or use of powders or release agents such as silicone. In accordance with a preferred embodiment of the invention, the coagulant solution contains an amphoteric surfactant present in amounts of between about 0.5% and 15% by weight of the composition. Preferably, surface active agents are present in amounts of from about 1% to about 10% by weight of the composition. According to the present invention, the preferred surfactant is a cationic surface active agent available from Mona Industries, 76 E. 24th Street, Patterson, N.J., under the trade name Phospholipid PT-L, however, other quaternary surfactants, amphoteric surfactants, triquaternary phosphate esters and betaine derivatives may be used.

Likewise, the inclusion in the coagulant solution of a wax compound, such as polypropylene wax, aids in detackification and release of the formed article from the former. In those embodiments of the invention comprising a coagulant containing a release agent, the amount of polypropylene wax included is at least 0.25% by weight of the total composition. Preferably, the composition will contain polypropylene wax in an amount of not greater than about 10% by weight of the composition. More preferably the polypropylene wax will be present in an amount of from about 0.5% to about 5.0% by weight of the composition. A suitable polypropylene wax emulsion for use in the invention is available under the trade name Michem Emulsion 43040. Other detackification agents suitable for use in accordance with the present invention include low and high density homopolymers and copolymers, microcrystalline waxes, castor waxes, long chain fatty esters, paraffin wax, bees wax and polyamide wax.

While the invention has been described in conjunction with specific embodiments thereof, it is evident that alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A process for fabricating a powder-free, tack-free, silicone-free rubber article which comprises:
   a. dipping a shaped, pre-heated former into an aqueous, powder-free solution which solution comprises an aqueous, salt stable polychloroprene dispersion and an inorganic metal salt;
   b. dipping the former in a solution of natural rubber latex to form a gelled latex film to create a tack-free surface for the article;
   c. leaching the gelled latex film, curing the formed rubber article on the former and dry stripping the cured tack-free article from the former.

2. A process according to claim 1 wherein the aqueous, powder-free solution further comprises a cross-linking agent selected from the group consisting essentially of aqueous based dicarboxylic and tricarboxylic acids, polyamide resins, melamine formaldehyde resins and mixtures thereof and further wherein the cross-linking agent is present in an amount between about 3% and 15% by weight of the coagulant composition.

3. A process according to claim 1 wherein the aqueous, powder-free solution further comprises a surfactant selected from the group consisting essentially of quaternary surfactants, amphoteric surfactants, triquaternary phosphate esters, betaine derivatives and mixtures thereof and further wherein the surfactant is present in an amount between about 0.5% and 15% by weight of the coagulant composition.

4. A process according to claim 1 wherein the aqueous, powder-free solution further comprises a wax compound selected from the group consisting essentially of low and high density homopolymers and copolymers, microcrystalline waxes, castor waxes, long chain fatty esters, paraffin wax, bees wax, polyamide wax and mixtures thereof and further wherein the wax compound is present in an amount between about 0.25% and 10% by weight of the coagulant composition.

5. An article of manufacture made using the process of claim 1.

6. The article of claim 5 wherein the article is a glove.

7. The article of claim 5 wherein the article is a condom.

8. An article of manufacture made using the powder-free coagulant composition of claim 1.

9. A process for preparing a dipped tack-free and powder-free rubber article which includes the steps of:
   a. dipping a preheated former for the article into a powder-free composition comprising a salt stable polymer dispersion and an inorganic salt coagulating agent for natural rubber latex, wherein the polymer dispersion is a dispersion of polychloroprene to form a coagulant coated surface on the former that is capable of being dry-stripped from the former;
   b. dipping the coagulant coated former into a compounded natural rubber latex to form a gelled latex film to create a tack-free surface for the article;
   c. leaching the gelled latex film;
   d. curing the coated, gelled latex film on the formers in an oven; and
   e. dry stripping the cured tack-free article from the former.

10. A process according to claim 9, in which the polychloroprene content is in a range of about 1% to 20% of the total coagulant content.

11. A process according to claim 9, in which the inorganic salt is an aqueous solution of calcium nitrate.

12. A process according to claim 11, in which the calcium nitrate content is in a range of about 7% to 50% of the composition.

13. A process according to claim 9, in which a cross-linking agent is added to cure the salt stable polymer dispersion.

14. A process according to claim 9, further comprising a release agent which comprises a polypropylene wax emulsion and a cationic surface active agent.

15. A process according to claim 14, in which the polypropylene wax content is in the range of about 0.25% to 10% of the composition.

16. A method according to claim 9 further comprising the step of overdipping the gelled latex film produced in step c) with copolymers of vinyl methyl ether and maleic esters.

17. A method according to claim 9 further comprising the step of overdipping the former with a silicone emulsion.

18. A dipped rubber article made in accordance with the method of claim 9, wherein said article comprises a medical glove.

\* \* \* \* \*